United States Patent
Uang

(10) Patent No.: US 12,454,606 B2
(45) Date of Patent: Oct. 28, 2025

(54) METHOD OF PRODUCING REPROCESSED MATERIAL OF RECYCLED POLYVINYL BUTYRAL

(71) Applicants: Yuh-Jye Uang, Taichung (TW); Shu-Hue Shao, Taichung (TW); FENGDA COMPOSITE MATERIALS CO., LTD., Taichung (TW)

(72) Inventor: Yuh-Jye Uang, Taichung (TW)

(73) Assignees: Yuh-Jye Uang, Taichung (TW); Shu-Hue Shao, Taichung (TW); FENGDA COMPOSITE MATERIALS CO., LTD., Taichung (TW)

( * ) Notice: Subject to any disclaimer, the term of this patent is extended or adjusted under 35 U.S.C. 154(b) by 574 days.

(21) Appl. No.: 17/951,149

(22) Filed: Sep. 23, 2022

(65) Prior Publication Data
US 2023/0174737 A1    Jun. 8, 2023

(30) Foreign Application Priority Data
Dec. 8, 2021    (TW) .................................. 110145963

(51) Int. Cl.
| C08G 63/02 | (2006.01) |
| C08J 11/22 | (2006.01) |
| C08J 11/28 | (2006.01) |
| C09J 129/14 | (2006.01) |
| C09J 175/04 | (2006.01) |

(52) U.S. Cl.
CPC ................ *C08J 11/22* (2013.01); *C08J 11/28* (2013.01); *C09J 129/14* (2013.01); *C09J 175/04* (2013.01); *C08J 2329/14* (2013.01)

(58) Field of Classification Search
USPC .................... 521/40.5; 528/190, 193, 194
See application file for complete search history.

(56) References Cited

U.S. PATENT DOCUMENTS

2020/0095391 A1*    3/2020   Uang ....................... C08J 9/104

FOREIGN PATENT DOCUMENTS

| EP | 0850743 A1 * | 7/1998 | |
| GB | 2387850 A * | 10/2000 | ......... B29B 17/0042 |
| WO | WO-9302141 A1 * | 2/1993 | .............. C08J 11/06 |

OTHER PUBLICATIONS

EP 0850743 A1 Machine Translation (Year: 1998).*

* cited by examiner

*Primary Examiner* — Terressa Boykin
(74) *Attorney, Agent, or Firm* — WPAT, PC

(57) ABSTRACT

Provided are a reprocessed material of recycled polyvinyl butyral and the method for producing the same. The method comprises steps (A) and (B); step (A): heating a first mixture comprising recycled polyvinyl butyral and an antiblocking agent; and step (B): adding a free radical initiator into the first mixture to undergo a reaction to obtain the reprocessed material of recycled polyvinyl butyral; wherein the free radical initiator comprises an azo compound, an organic peroxide or a combination thereof, the reprocessed material of recycled polyvinyl butyral has a MI of greater than 7 g/10 min at 190° C. and under 2.16 kg of load. The reprocessed material of recycled polyvinyl butyral has excellent reprocessability, so it is applicable to make a hot adhesive and a composite material film.

12 Claims, No Drawings

METHOD OF PRODUCING REPROCESSED MATERIAL OF RECYCLED POLYVINYL BUTYRAL

CROSS-REFERENCE TO RELATED APPLICATION

Pursuant to 35 U.S.C. § 119 (a), this application claims the benefit of the priority of Taiwan Patent Application No. 110145963 filed on Dec. 8, 2021, which is incorporated by reference in the present application in its entirety. BACKGROUND OF THE INVENTION

1. Field of the Invention

The present invention relates to recycling or processing of a waste, and in particular to dealing with recycled polyvinyl butyral.

2. Description of Related Art

Polyvinyl butyral (PVB) is often used to produce the interlayer film(s) between two or more pieces of glass to form laminated safety glass mainly applied in fields of an automotive industry and buildings due to its high transparency, high toughness and high elasticity. However, virgin PVB is expensive and the discarded PVB, which is difficult to degrade, needs to be treated by incineration, thereby causing serious environmental burdens. Therefore, if the discarded PVB can be recycled and reused, it may create a great value in the view of economy and environmental protection.

In general, the recycled PVB (abbreviated as rPVB) may have two kinds from different sources: the first one is postindustrial recycled (PIR) PVB, which is recycled from scraps generated from the process of manufacturing PVB products; the second one is post-consumer recycled (PCR) PVB, which is recycled from the discarded PVB products after consumer uses to be a raw material for other products.

However, in order to avoid deformation and softening when exposed to sunlight, the virgin PVB used to make the interlayer film should have a sufficient rigidity; that is, the virgin PVB has a lower melt flow index (MI), so it easily accumulates on hot metal elements of the processing equipment. Accordingly, the rPVB often has an unsatisfactory reprocessability, which limits the breadth of subsequent applications.

In addition, since the PVB interlayer film between two pieces of glass needs to be added with a large amount of plasticizer to adjust the adhesion between the PVB interlayer film and the glass, the adhesion strength of the rPVB containing the aforesaid plasticizer will become worse for the surface of non-glass products such as textiles or other polymer films, which is not suitable for subsequent applications.

SUMMARY OF THE INVENTION

To overcome the shortcomings of the conventional rPVB, an objective of the present invention is to provide a method of producing a reprocessed material of the rPVB to obtain a reprocessed material of the rPVB with higher MI. Therefore, the obtained reprocessed material of the rPVB can have an improved reprocessability and can be applied to various ways of film formation to broaden subsequent applications.

Another objective of the present invention is to provide a method of producing a reprocessed material of the rPVB, which is simple and cost-effective and has a higher commercial potential.

To achieve the foresaid objectives, the invention is to provide a method of producing a reprocessed material of the rPVB, which comprises step (A) and step (B). In step (A), a first mixture is heated, and the first mixture comprises rPVB and an antiblocking agent. In step (B), a free radical initiator is added into the first mixture to undergo a reaction, so as to obtain the reprocessed material of the rPVB; wherein the free radical initiator comprises an azo compound, an organic peroxide or a combination thereof, the organic peroxide is selected from a group consisting of: 2,5-dimethyl-2,5-di(2-ethylhexanoylperoxy) hexane, dilauroyl peroxide (LPO), benzoyl peroxide (BPO) and any combination thereof, wherein the reprocessed material of rPVB has a MI of greater than 7 grams per 10 minutes (g/10 min) at a temperature of 190° C. and under 2.16 kilograms (kg) of load.

In general, the free radical initiator is used to initiate an additional reaction where two or more molecules combine to form a larger one by opening unsaturated double bonds, so it is often used as a polymerization initiator or a curing agent. An unsaturated resin, such as low density polyethylene (LDPE) and poly(methyl methacrylate) (PMMA), is mixed with the free radical initiator to increase the resin's molecular weight or the degree of crosslinking, thereby making it more difficult to flow. However, in the present invention, the rPVB undergoes a cleavage reaction by adding the specific free radical initiator into the rPVB, wherein the free radicals capture hydrogen atoms of the main chain of the rPVB to induce the cleavage reaction, so that the original molecular weight distribution of the rPVB and/or the local crystallinity or level of entanglement of the molecular chain are changed, resulting in a decrease in viscoelasticity and an increase in MI of the rPVB. Accordingly, when the reprocessed material of rPVB is used as a raw material of various films, it is easier to be mixed evenly with other materials and the needed processing temperature can be lowered, which is suitable for various ways of film formation to produce various products, and to broaden the applications of the rPVB.

In accordance with the present invention, the rPVB may be a PIR PVB or a PCR PVB. Preferably, the rPVB may comprise a scrap material of PVB films from producing automotive safety glass or a glass waste containing PVB films; for example, the rPVB may be obtained from the wastes of an automotive safety glass, but it is not limited thereto.

In accordance with the present invention, in step (A), the antiblocking agent may comprise an alkali metal salt of a fatty acid, an alkali earth salt of a fatty acid, a transition metal salt of a fatty acid, a fatty acid amide or any combination thereof, but it is not limited thereto. Specifically, the alkali metal salt of a fatty acid may be potassium stearate; the alkali earth salt of a fatty acid may be calcium stearate; the transition metal salt of a fatty acid may be zinc stearate, but it is not limited thereto.

Preferably, in the first mixture, based on 100 parts by weight of the rPVB, the antiblocking agent may be in an amount from 0.05 parts by weight to 5.0 parts by weight, but it is not limited thereto; more preferably, based on 100 parts by weight of the rPVB, the antiblocking agent may be in an amount from 0.1 parts by weight to 3.5 parts by weight.

Preferably, in step (B), based on 100 parts by weight of the rPVB, the free radical initiator may be in an amount from 0.75 parts by weight to 9.5 parts by weight, but it is not limited thereto.

Preferably, in step (B), the azo compound may comprise 2,2'-azobis(2-methylpropionitrile, AIBN), 2,2'-azobis(2-methylbutyronitrile, AMBN), 1,1'-azobis(cyclohexane-1-carbonitrile, ACCN) or any combination thereof, but it is not limited thereto. In some cases, the free radical initiator May only be the azo compound; for example, the free radical initiator may be AIBN or a combination of AIBN and ACCN, but it is not limited thereto.

Preferably, in step (B), based on 100 parts by weight of the rPVB in the first mixture, the azo compound may be in an amount from 0.1 parts by weight to 8.0 parts by weight, but it is not limited thereto; more preferably, based on 100 parts by weight of the rPVB, the azo compound may be in an amount from 0.3 parts by weight to 5.0 parts by weight.

In accordance with the present invention, the organic peroxide has an —O—O— bond in the molecular structure, usually considered as a derivative of hydrogen peroxide. The organic peroxide may undergo a pyrolysis at a relative lower temperature, and it is easy to generate free radicals by reacting with reducing substances. In some cases, the free radical initiator may only be the organic peroxide; for example, the free radical initiator may be LPO or a combination of LPO and BPO, but it is not limited thereto.

Preferably, in step (B), based on 100 parts by weight of the rPVB in the first mixture, the organic peroxide may be in an amount from 0.01 parts by weight to 2.5 parts by weight, but it is not limited thereto; more preferably, based on 100 parts by weight of the rPVB, the organic peroxide may be in an amount from 0.05 parts by weight to 1.5 parts by weight.

In some embodiments, the free radical initiator may be a combination of the azo compound and the organic peroxide; for example, the free radical initiator may be a combination of AIBN and LPO, a combination of AMBN and BPO, or a combination of AIBN and BPO, but it is not limited thereto.

In order to further improve the applicability of the reprocessed material of rPVB, in some embodiments, the step (B) may comprise step (b1) and step (b2). In step (b1), the free radical initiator is added into the first mixture to undergo the reaction to obtain a first intermediate. In step (b2), an additive is mixed with the first intermediate, so as to obtain the reprocessed material of rPVB.

Preferably, the additive may comprise an ultraviolet (UV) absorber, an antioxidant or a combination thereof, but it is not limited thereto. Specifically, addition of the antioxidant is beneficial to the subsequent screw granulation process or screw extrusion film-forming process, so as to obtain the reprocessed material of rPVB having a good thermal stability.

Preferably, based on a total dry weight of the reprocessed material of rPVB, the additive may be in an amount from 0.1 percent by weight (wt %) to 4.5 wt %, but it is not limited thereto.

Preferably, the UV absorber may comprise benzophenone, benzotriazole, 2-(2H-benzotriazol-2-yl)-4,6-di-tert-pentylphenol or any combination thereof. Preferably, based on a total dry weight of the reprocessed material of rPVB, the UV absorber may be in an amount from 0.1 wt % to 1.5 wt %, but it is not limited thereto. More preferably, the UV absorber may be in an amount from 0.3 wt % to 1.0 wt %.

Preferably, the antioxidant may comprise hindered phenol antioxidants such as 2,6-di-tert-butyl-4-methylphenol (BHT), n-octadecyl(3-[3,5-di-tert-butyl-4-hydroxyphenyl] propionate or a combination thereof, but it is not limited thereto. Preferably, based on a total dry weight of the reprocessed material of rPVB, the antioxidant may be in an amount from 0.1 wt % to 3.0 wt %, but it is not limited thereto. More preferably, the UV absorber may be in an amount from 0.12 wt % to 1.0 wt %.

Preferably, a heating temperature in the step (A) may range from 50° C. to 120° C., but it is not limited thereto; more preferably, the heating temperature in the step (A) may range from 60° C. to 100° C.

Preferably, a reaction temperature in the step (b1) may range from 60° C. to 140° C., but it is not limited thereto; more preferably, the reaction temperature in the step (b1) may range from 65° C. to 135° C.

Since the temperature will affect the reactivity of the free radical initiator and different free radicals may have different pyrolysis conditions, preferably, the free radical initiator in the step (B) may choose the kind of free radical initiator which has a half-life of 0.1 hour at a temperature from 80° C. to 130° C.; the free radical initiator in the step (B) may choose the kind of free radical initiator which has a half-life of 0.1 hour at a temperature from 85° C. to 125° C.

22 Preferably, a temperature in the step (b2) may range from 100° C. to 140° C., but it is not limited thereto; more preferably, the reaction temperature in the step (b2) may range from 105° C. to 130° C.

Specifically, the mixing method to form the first mixture in the step (A) may adopt a two-roll mill or a kneader reactor, but it is not limited thereto. Preferably, the mixing method to form the first mixture in the step (A) may adopt the kneader reactor. Preferably, the mixing method may adopt the same method (e.g. using a kneader) and continue from the step (A) to the step (b2) until the reprocessed material of rPVB is obtained.

In addition, the invention also provides a reprocessed material of the rPVB prepared from the above-mentioned method; wherein the reprocessed material of rPVB has a MI of greater than 7 g/10 min at a temperature of 190° C. and under 2.16 kg of load. Preferably, the reprocessed material of rPVB May have the MI of greater than or equal to 10 g/10 min and smaller than or equal to 35 g/10 min at a temperature of 190° C. and under 2.16 kg of load.

In some embodiments, the reprocessed material of rPVB may have a shape of pellet; that is, the above-mentioned method of producing the reprocessed material of rPVB may cut the reprocessed material of rPVB into multiple uniform pellets in the end. In other embodiments, the reprocessed material of rPVB may have a shape of thin-film.

In addition, the invention also provides a hot melt adhesive (HMA), which comprises the reprocessed material of rPVB produced by the above-mentioned method.

Preferably, the hot melt adhesive may further comprise a thermoplastic polyurethane (TPU) with a low-melting-point; wherein the TPU with a low-melting-point has a flow beginning temperature (Tfb) larger than or equal to 80° C. and smaller than or equal to 120° C., but it is not limited thereto. The flow beginning temperature refers to the temperature at which one polymer begins to flow. Preferably, based on a total dry weight of the hot melt adhesive, the TPU with a low-melting-point may be in an amount from 50 wt % to 90 wt % and the reprocessed material of rPVB may be in an amount from 10 wt % to 50 wt %, but it is not limited thereto.

In order to make the hot melt adhesive more eco-friendly and meet some international standards such as Global Recycle Standard (GRS), the TPU with a low-melting-point may partially or fully adopt recycled TPU.

For example, the hot melt adhesive may be applied to shoe materials or ready-to-wear, but it is not limited thereto.

Besides, the invention also provides a composite material film, which comprises a TPU with a high-melting-point and the reprocessed material of rPVB; wherein the TPU with a high-melting-point has a flow beginning temperature larger than 120° C. and smaller than or equal to 170° C. Preferably, based on a total dry weight of the composite material film, the TPU with a high-melting-point may be in an amount from 60 wt % to 85 wt % and the reprocessed material of rPVB may be in an amount from 15 wt % to 40 wt %, but it is not limited thereto.

In order to make the composite material film more eco-friendly and meet some international standards such as Global Recycle Standard (GRS), the TPU with a high-melting-point may partially or fully (i.e. 100%) adopt recycled TPU.

In some embodiments, the composite material film may stack on a fabric or a plastic film to form a multilayered composite sheet, but it is not limited thereto. The fabric has no specific limitations on materials; for example, the material of the fabric may be natural fibers, synthetic fibers or blend fibers of natural fibers and synthetic fibers. The natural fibers may be cotton, linen or wool; the synthetic fibers may be Nylon, a polyester or a polypropylene (PP). The material of the plastic film may be selected from polyurethane (PU) or TPU, but it is not limited thereto.

In some cases, the multilayered composite sheet may adopt a hot pressing process to make the composite material film attached to the fabric directly; or, the composite material film may be attached to the plastic film directly without other adhesives. For example, the hot pressing may be proceeding for 30 seconds at 128° C. and under 6 kilograms per square centimeter ($kg/cm^2$) of load, but it is not limited thereto. In aforesaid case, the resulting multilayered composite sheet is one kind of no sewn multilayered composite sheet.

In other cases, the multilayered composite sheet may be obtained by using an adhesive to stick the composite material film and the fabric or the plastic film, and the adhesive has no limitations. Preferably, the adhesive may be the aforesaid hot melt adhesive comprising the reprocessed material of rPVB. In aforesaid case, the resulting multilayered composite sheet is another kind of no sewn multilayered composite sheet.

Specifically, the multilayered composite sheet may sequentially comprise a PU film, the composite material film of the present invention and the hot melt adhesive of the present invention; or, the multilayered composite sheet may sequentially comprise a PU film, the hot melt adhesive of the present invention, the composite material film of the present invention and the hot melt adhesive of the present invention.

For example, the multilayered composite sheet may be applied to basketball skin, shoe materials, sport braces or bicycle inner tubes, but it is not limited thereto.

DETAILED DESCRIPTION OF THE PREFERRED EMBODIMENT

Hereinafter, one skilled in the arts can easily realize the advantages and effects of the present invention from the following examples and reference examples. It should be understood that the descriptions proposed herein are just preferable examples only for the purpose of illustrations, not intended to limit the scope of the invention. Various modifications and variations could be made in order to practice or apply the present invention without departing from the spirit and scope of the invention.

Raw Materials
 1. rPVB-1: a PIR PVB purchased from Protrade Asia Limited; the PIR PVB is obtained by recycling scraps generated from the PVB products;
 2. rPVB-2: a PCR PVB purchased from Protrade Asia Limited;
 3. Antiblocking agent: zinc stearate;
 4. Azo compound I: AIBN purchased from Nouryon Co., Ltd.;
 5. Azo compound II: AMBN purchased from Nouryon Co., Ltd.;
 6. Azo compound III: ACCN purchased from Nouryon Co., Ltd.;
 7. Organic peroxide a: LPO purchased from Nouryon Co., Ltd.;
 8. Organic peroxide b: BPO purchased from Taiwan Shirakawa Chemical Industry Co., Ltd;
 9. UV absorber: Lowilite 20 purchased from Ming Ching Trading co., Ltd.;
 10. Antioxidant: ANOX 1315 purchased from Ming Ching Trading co., Ltd.;
 11. TPU-i: 80 AU having a Tfb of 110° C. purchased from Eastern Resins Industrial Co. Ltd.;
 12. TPU-ii: 85 AN having a Tfb of 113° C. purchased from Eastern Resins Industrial Co. Ltd.;
 13. TPU-iii: 85 UL having a Tfb of 106° C. purchased from Eastern Resins Industrial Co. Ltd.;
 14. TPU-iv: 85A DP2 having a Tfb of 125° C. purchased from Jah Yih Enterprise Co. Ltd.;
 15. TPU-v: RS1-90A DP2 having a Tfb of 138° C. purchased from Jah Yih Enterprise Co. Ltd.;
 16. TPU-vi: F111 95A having a Tfb of 155° C. purchased from Jah Yih Enterprise Co. Ltd.;
 17. TPU-vii: F111 85A having a Tfb of 140° C. purchased from Jah Yih Enterprise Co. Ltd.

Manufacturing Parameters of the Method of Producing a Reprocessed Material of rPVB:

(1) Parameter Condition I:

Step (A): First, a certain amount of fragmented rPVB and zinc stearate were put in a kneader together, and then they continued compounding at 60° C. until a dough-like first mixture was formed. Step (b1): Next, a part of the free radical initiator (such as an organic peroxide) was added into the first mixture when the first mixture was mixed and heated until the material temperature reached 70° C.; and then the remaining free radical initiator such as an azo compound were divided into three parts which were added into the first mixture in batches. After a completion of the reaction, the first intermediate was obtained. Step (b2): the first intermediate was heated to 110° C., followed by adding the desired additive(s) into the first intermediate which continued being mixed for 5 minutes; finally, the finished product by compounding passed through a single screw extruder underwater pelletizing machine to pelletize, followed by using a double-roller calendar to output a reprocessed material of rPVB which had a shape of thin-film whose thickness was 0.3 millimeters (mm).

(2) Parameter Condition II:

Step (A): First, a certain amount of fragmented rPVB and zinc stearate were put in a kneader together, and then they continued compounding at 80° C. until a dough-like first mixture was formed. Step (b1): Next, a part of the free radical initiator (such as an organic peroxide) was added into the first mixture when the first mixture was mixed and heated until the material temperature reached 100° C.; and then the remaining free radical initiator such as an azo compound were divided into three parts which were added into the first mixture in batches. After a completion of the reaction, the first intermediate was obtained. Step (b2): the first intermediate was heated to 120° C., followed by adding the desired additive(s) into the first intermediate which continued being mixed for 5 minutes; finally, the finished product by compounding passed through a single screw extruder underwater pelletizing machine to pelletize, followed by using a double-roller calendar to output a reprocessed material of rPVB which had a shape of thin-film whose thickness was about 0.3 mm.

<Reprocessed Material of rPVB>

All reprocessed materials of rPVB of Examples were respectively produced according to the content of each ingredient (weight unit: gram (g)) and the parameter condition shown in Table 1 and Table 2. Take the reprocessed material of rPVB E1 of Example 1 for example.

First, 1000 g of fragmented rPVB-1 and 10 g of zinc stearate were put in a kneader together, and then they continued compounding at 60° C. until a dough-like first mixture was formed. Next, 1 g of LPO was added into the first mixture when the first mixture was mixed and heated until the material temperature reached 70° C.; and then 25 g of AIBN was divided into three parts which were added into the first mixture in batches. After a completion of the reaction, the first intermediate was obtained. In this example, the completion of the reaction was determined by detecting the MI of the first intermediate until the MI almost had no fluctuation. Subsequently, the first intermediate was heated to 110° C., followed by adding the UV absorber and the antioxidant into the first intermediate which continued being mixed for 5 minutes; finally, the finished product by compounding passed through a single screw extruder underwater pelletizing machine to pelletize, followed by using a double-roller calendar to output the reprocessed material of rPVB E1 which had a shape of thin-film.

Reference Example 1 (PIR PVB)

100 g of fragmented rPVB-1 and 2 g of zinc stearate were put in a kneader together, and then they continued compounding at 110° C. for 5 minutes until they were mixed uniformly to form a mixture. Next, the mixture was put into the double-roller calendar to output the reprocessed material of rPVB R1 which had a shape of thin-film.

Reference Example 2 (PCR PVB)

100 g of fragmented rPVB-2 and 2 g of zinc stearate were put in a kneader together, and then they continued compounding at 110° C. for 5 minutes until they were mixed uniformly to form a mixture. Next, the mixture was put into the double-roller calendar to output the reprocessed material of rPVB R2 which had a shape of thin-film.

<Characteristic Analysis of the Reprocessed Material of rPVB>

The reprocessed materials of rPVB E1 to E8 and the reprocessed materials of rPVB R1 and R2 were respectively analyzed by the following methods for MI, tensile strength, ultimate elongation in percent and tearing strength, and the results were listed in Table 1 and Table 2. In addition, the reprocessed materials of rPVB E1 to E8 and the reprocessed materials of rPVB R1 and R2 were also respectively analyzed by a dynamic mechanical analyzer (DMA) to obtain their respective glass transition temperature (Tg) and its loss tangent (tanδ), Tfb and its tanδ, and the results were also recorded in Table 1 and Table 2. In order to ensure the experimental significance and validity of the characteristic analysis, the reprocessed materials of rPVB E1 to E8 and R1 and R2 were each respectively analyzed by the same test method. Therefore, it can be understood that the difference in characteristics between the reprocessed materials of rPVB E1 to E8 and R1 and R2 was mainly caused by the difference in the free radical initiators and/or the parameter conditions used in each of the manufacturing methods.

2 Analysis:
1. MI: measured at a temperature of 190° C. and under 2.16 kg of load in accordance with the standard ASTM D1238 A;
2. Tensile strength: measured in accordance with the standard ASTM D412;
3. Ultimate elongation in percent: measured in accordance with the standard ASTM D412;
4. Tearing strength: measured in accordance with the standard ASTM D624;
5. Tg and its tanδ: measured in accordance with the standard ASTM D4065;
6. Tfb and its tanδ: measured in accordance with the standard ASTM D4065.

TABLE 1

| Example/Reference Example No. | E1 | E2 | E3 | E4 | E5 |
|---|---|---|---|---|---|
| rPVB-1 | 1000.00 | 4000.00 | 1000.00 | 3000.00 | 3000.00 |
| rPVB-2 | 0 | 0 | 0 | 0 | 0 |
| Antiblocking Agent | 10.00 | 20.00 | 10.00 | 35.00 | 35.00 |
| Azo Compound I | 25.00 | 75.00 | 25.00 | 75.00 | 75.00 |
| Azo Compound II | 0 | 0 | 0 | 0 | 0 |
| Azo Compound III | 0 | 0 | 0 | 0 | 0 |
| Organic Peroxide a | 1.00 | 0 | 0 | 1.50 | 0 |
| Organic Peroxide b | 0 | 0 | 0.05 | 0 | 1.50 |
| UV Absorber | 4.00 | 16.00 | 4.00 | 12.00 | 12.00 |
| Antioxidant | 2.00 | 8.00 | 2.00 | 6.00 | 6.00 |
| Parameter Condition No. | (I) | (I) | (I) | (I) | (I) |
| MI (g/10 min) | 15.80 | 9.60 | 9.10 | 14.13 | 10.60 |
| Tensile Strength (kg/cm$^2$) | 279.50 | 268.50 | 286.97 | 167.94 | 167.94 |
| Ultimate Elongation in percent (%) | 246.00 | 234.50 | 218.95 | 223.91 | 223.91 |
| Tearing Strength (kg/cm) | 41.50 | 45.00 | 58.00 | 28.98 | 28.98 |
| Tg (° C.) | 26.29 | 27.85 | 28.94 | 27.55 | 28.15 |
| Tanδ at Tg | 1.25 | 1.21 | 1.20 | 1.19 | 1.22 |
| Tfb (° C.) | 123.77 | 129.79 | 130.37 | 126.13 | 129.22 |
| Tanδ at Tfb | 1.02 | 1.07 | 1.01 | 1.03 | 1.00 |

TABLE 2

| Example/Reference Example No. | E6 | E7 | E8 | R1 | R2 |
|---|---|---|---|---|---|
| rPVB-1 | 3000.00 | 3000.00 | 0 | 100 | 0 |
| rPVB-2 | 0 | 0 | 5500.00 | 0 | 100 |
| Antiblocking Agent | 30.00 | 30.00 | 55.00 | 2.00 | 2 |
| Azo Compound I | 75.00 | 75.00 | 137.50 | 0 | 0 |
| Azo Compound II | 0 | 0 | 0 | 0 | 0 |
| Azo Compound III | 0 | 0 | 0 | 0 | 0 |
| Organic Peroxide a | 0 | 0 | 0 | 0 | 0 |
| Organic Peroxide b | 1.50 | 1.50 | 2.75 | 0 | 0 |
| UV Absorber | 12.00 | 12.00 | 22.00 | 0 | 0 |
| Antioxidant | 6.00 | 6.00 | 11.00 | 0 | 0 |
| Parameter Condition No. | (I) | (I) | (II) | — | — |
| MI (g/10 min) | 10.47 | 16.30 | 13.60 | 4.34 | 4.09 |
| Tensile Strength (kg/cm$^2$) | 255.01 | 270.82 | 185.01 | 266.00 | 163.7 |
| Ultimate Elongation in percent (%) | 242.86 | 241.00 | 194.77 | 263.00 | 208.2 |
| Tearing Strength (kg/cm) | 39.79 | 37.03 | 37.43 | 45.00 | 30 |
| Tg (° C.) | 29.91 | 30.52 | 25.22 | 28.60 | 29.46 |
| Tanδ at Tg | 1.23 | 1.23 | 1.23 | 1.15 | 1.28 |
| Tfb (° C.) | 131.95 | 124.83 | 127.21 | 132.18 | 125.16 |
| Tanδ at Tfb | 1.03 | 1.01 | 1.03 | 1.03 | 1.00 |

As shown in Tables 1 and 2, compared to the reprocessed material of rPVB R1 of Reference Example 1, each of the reprocessed materials of rPVB E1 to E7 of Examples 1 to 7 which comprised the same rPVB-1 but was obtained by the method of the present invention indeed had a higher MI (larger than 9 g/10 min) than that of the reprocessed material of rPVB R1 (4.34 g/10 min). Similarly, compared to the reprocessed material of rPVB R2 of Reference Example 2, the reprocessed material of rPVB E8 of Example 8 which comprised the same rPVB-2 but was obtained by the method of the present invention indeed had a higher MI (larger than 13 g/10 min) than that of the reprocessed material of rPVB R2 (4.09 g/10 min). It can demonstrate that the reprocessed materials of rPVB obtained by the method of the present invention has better reprocessability.

In addition, when the tanδ at the Tg point is greater than or equal to 1 in the DMA analysis, the test sample is considered as a material having a function of absorbing shock and a property of low rebound. Accordingly, from the results of DMA analyses in Table 1 and Table 2, it showed that the reprocessed materials of rPVB obtained by the method of the present invention can have properties of shock absorption and low rebound.

<Hot Melt Adhesive>

Hot melt adhesives of Examples were respectively produced in accordance with the content of each ingredient (weight unit: gram (g)) shown in Table 3. Take the hot melt adhesive HMA-1 of Example 9 for example. 4000 g of the reprocessed material of rPVB E4, 5000 g of TPU-i and 1000 g of TPU-iii were put in a kneader together, and then they continued compounding at 145° C. to obtain a finished product. Finally, the finished product by compounding passed through a single screw extruder underwater pelletizing machine to pelletize, followed by using a single-screw T-Die extruded machine to output the hot melt adhesive HMA-1 which had a shape of thin-film.

<Characteristic Analysis of the Hot Melt Adhesive>

The hot melt adhesives HMA-1 to HMA-5 were respectively analyzed by the following methods for MI, Tfb and adhesion tests, and the results were listed in Table 3. In order to ensure the experimental significance and validity of the characteristic analysis, the hot melt adhesives HMA-1 to HMA-5 were each respectively analyzed by the same test method. Therefore, it can be understood that the difference in characteristics between the hot melt adhesives HMA-1 to HMA-5 was mainly caused by the difference in the raw materials used for the hot melt adhesives HMA-1 to HMA-5.

Analysis:
1. MI: measured at a temperature of 190° C. and under 2.16 kg of load in accordance with the standard ASTM D1238 A;
2. Tfb: measured by the DMA in accordance with the standard ASTM D4065;
3. Adhesion Test (I): to measure the adhesion strength of the hot melt adhesive bonding between a TPU film and a fabric in accordance with G-44 of Nike standard measurement;
4. Adhesion Test (II): to measure the adhesion strength of the hot melt adhesive bonding between two PU films in accordance with G-44 of Nike standard measurement;
5. Adhesion Test (III): to measure the adhesion strength of the hot melt adhesive bonding between two TPU films in accordance with G-44 of Nike standard measurement.

When the measured adhesion strength of the hot melt adhesive obtained in Adhesion Tests (I) to (III) was equal to or larger than 2.5 N/mm, it was determined as passing the criterion of G-44 of Nike standard measurement.

TABLE 3

| Example No./HMA No. | | E9/HMA-1 | E10/HMA-2 | E11/HMA-3 | E12/HMA-4 | E13/HMA-5 |
|---|---|---|---|---|---|---|
| Reprocessed Material of rPVB | E1 | 0 | 0 | 0 | 0 | 0 |
| | E2 | 0 | 0 | 0 | 0 | 0 |
| | E3 | 0 | 0 | 0 | 0 | 0 |
| | E4 | 4000 | 0 | 0 | 0 | 0 |
| | E5 | 0 | 4000 | 0 | 0 | 0 |
| | E6 | 0 | 0 | 2160 | 0 | 0 |
| | E7 | 0 | 0 | 0 | 2000 | 0 |
| | E8 | 0 | 0 | 0 | 0 | 2000 |
| TPU-i | | 5000 | 0 | 2700 | 2500 | 2500 |
| TPU-ii | | 0 | 5000 | 0 | 0 | 0 |
| TPU-iii | | 1000 | 1000 | 540 | 500 | 500 |
| MI | | 16.00 | 13.00 | 21.13 | 4.51 | 39.60 |
| Tfb (° C.) | | 115.28 | 114.47 | 115.85 | 113.00 | 114.84 |
| Adhesion Test (I) Adhesion Strength (N/mm) | | 3.2-4.9 | 3.0-3.2 | 3.5-4.8 | 3.0-3.7 | 3.0-4.1 |
| Adhesion Test (II) Adhesion Strength (N/mm) | | 5.4 | 3.6-4.0 | 4.6-4.8 | 3.8-4.1 | 4.8 |
| Adhesion Test (III) Adhesion Strength (N/mm) | | 4.4-4.8 | 3.0-3.4 | 4.2-4.5 | 4.3-4.8 | 4.8 |

As shown in Table 3, the hot melt adhesives comprising the reprocessed material of rPVB of the present invention each had a Tfb not larger than 120° C., which conformed to the basic requirement of a hot melt adhesive.

In addition, all of the hot melt adhesives HMA-1 to HMA-5 respectively had an adhesion strength of larger than 2.5 N/mm in Adhesion Tests (I) to (III), so they all passed the criterion of G-44 of Nike standard measurement of having adhesion strength of "larger than or equal to 2.5 N/mm". It can be seen that the reprocessed material of rPVB of the present invention can be applied to a hot melt adhesive because of the high MI thereof; therefore, the resulting hot melt adhesive not only satisfies the requirement of adhesion strength but also conforms to the global sustainability and circularity trends to implement the concept of environmental protection.

<Composite Material Film>

Composite material films of Examples were respectively produced in accordance with the content of each ingredient (weight unit: gram (g)) shown in Table 4. Take the composite material film CMF-1 of Example 14 for example. 400 g of the reprocessed material of rPVB E6 and 600 g of TPU-iv were put in a kneader together, and then they continued compounding at 145° C. to obtain a finished product. Finally, the finished product by compounding passed through a single screw extruder underwater pelletizing machine to pelletize, followed by using a single-screw T-Die extruded machine to output the composite material film CMF-1 which had a shape of thin-film. The composite material film CMF-1 had a thickness of about 0.3 mm.

<Characteristic Analysis of the Composite Material Film>

The composite material films CMF-1 to CMF-3 were respectively analyzed by the following methods for MI, Tfb, tensile strength, ultimate elongation in percent and tearing strength, and the results were listed in Table 4. In order to ensure the experimental significance and validity of the characteristic analysis, the composite material films CMF-1 to CMF-3 were each respectively analyzed by the same test method. That is, it can be understood that the difference in characteristics between the composite material films CMF-1 to CMF-3 was mainly caused by the difference in the raw materials used for the composite material films CMF-1 to CMF-3.

Analysis:

1. MI: measured at a temperature of 190° C. and under 2.16 kg of load in accordance with the standard ASTM D1238 A;
2. Tfb: measured by the DMA in accordance with the standard ASTM D4065;
3. Tensile strength: measured in accordance with the standard ASTM D412;
4. Ultimate elongation in percent: measured in accordance with the standard ASTM D412;
5. Tearing strength: measured in accordance with the standard ASTM D624.

TABLE 4

| Example No./ Composite Material Film No. | | E14/ CMF-1 | E15/ CMF-2 | E16/ CMF-3 |
| --- | --- | --- | --- | --- |
| Reprocessed Material of rPVB | E1 | 0 | 0 | 0 |
| | E2 | 0 | 0 | 0 |
| | E3 | 0 | 0 | 0 |
| | E4 | 0 | 0 | 0 |
| | E5 | 0 | 0 | 0 |
| | E6 | 400 | 400 | 0 |
| | E7 | 0 | 0 | 300 |
| | E8 | 0 | 0 | 0 |
| TPU-iv | | 600 | 600 | 0 |
| TPU-v | | 0 | 0 | 0 |
| TPU-vi | | 0 | 0 | 350 |
| TPU-vii | | 0 | 0 | 350 |

TABLE 4-continued

| Example No./ Composite Material Film No. | E14/ CMF-1 | E15/ CMF-2 | E16/ CMF-3 |
| --- | --- | --- | --- |
| MI | 19.2 | 18.45 | 23.5 |
| Tfb (° C.) | 120.68 | 121.43 | 145.68 |
| Tensile Strength (kg/cm$^2$) | 220 | 210 | 224.1 |
| Ultimate Elongation in percent (%) | 420 | 350 | 330.6 |
| Tearing Strength (kg/cm) | 94 | 94 | 83.8 |

The composite material films CMF-1 and CMF-2 respectively had a Tfb of about 120° C., so they could be applied to the multilayered composite sheet suitable for high frequency weld process. Besides, since the composite material film CMF-3 had a higher Tfb (145° C.), it could be applied to the multilayered composite sheet that is suitable for high-temperature resistance.

In addition, in other embodiments, the TPU comprised in the composite material film may be a recycled TPU, so that raw materials of the composite material film can be a completely recycled composition, especially recycled resins.

From the results in Table 4, the rPVB content of the composite material film comprising the reprocessed material of rPVB of the present invention could be increased and the composite material film had good mechanical properties, so it indicated that the reprocessed material of rPVB of the present invention indeed has better reprocessability, thereby making all of the components of the composite material film mixed well; as a result, the deterioration of mechanical properties after film formation caused by inability to mix uniformly can be avoided.

Moreover, the composite material film can increase the use of recycled materials, so the composite material film of the present invention can reduce waste of global resource by using "sustainable" raw materials, and the concept of environmental protection will be implemented.

In summary, the method of producing a reprocessed material of rPVB of the present invention indeed can produce a reprocessed material of rPVB with a higher MI than that of the conventional reprocessed material of rPVB, so the reprocessability of the reprocessed material of rPVB can be improved, which broadens the subsequent applications and raises the market values.

Even though numerous characteristics and advantages of the present invention have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A method of producing a reprocessed material of recycled polyvinyl butyral, comprising steps of:
    step (A): heating a first mixture, which comprises recycled polyvinyl butyral and an antiblocking agent; and
    step (B): adding a free radical initiator into the first mixture to undergo a reaction, so as to obtain the reprocessed material of recycled polyvinyl butyral;
    wherein the free radical initiator comprises an azo compound, an organic peroxide or a combination thereof; the organic peroxide is selected from a group consisting of: 2,5-dimethyl-2,5-di(2-ethylhexanoylperoxy) hexane, dilauroyl peroxide, benzoyl peroxide and any combination thereof;

wherein the reprocessed material of recycled polyvinyl butyral has a melt flow index (MI) of greater than 7 g/10 min at a temperature of 190° C. and under 2.16 kg of load.

2. The method of claim 1, wherein a heating temperature in the step (A) ranges from 50° C. to 120° C.

3. The method of claim 1, wherein a half-life of the free radical initiator in the step (B) is 0.1 hour at a temperature from 80° C. to 130° C.

4. The method of claim 1, wherein the step (B) comprises:
step (b1): adding the free radical initiator into the first mixture to undergo the reaction to obtain a first intermediate; and
step (b2): mixing an additive with the first intermediate, so as to obtain the reprocessed material of recycled polyvinyl butyral.

5. The method of claim 4, wherein a reaction temperature in the step (b1) ranges from 60° C. to 140° C.

6. The method of claim 4, wherein the additive comprises an ultraviolet absorber, an antioxidant or a combination thereof.

7. The method of claim 6, wherein the additive is in an amount from 0.1 wt % to 4.5 wt % based on a total dry weight of the reprocessed material of recycled polyvinyl butyral.

8. The method of claim 1, wherein the antiblocking agent is in an amount from 0.05 parts by weight to 5.0 parts by weight, based on 100 parts by weight of the recycled polyvinyl butyral in the first mixture.

9. The method of claim 1, wherein the azo compound comprises 2,2'-azobis(2-methylpropionitrile), 2,2'-azobis(2-methylbutyronitrile), 1,1'-azobis(cyclohexane-1-carbonitrile) or any combination thereof.

10. The method of claim 9, wherein the azo compound is in an amount from 0.1 parts by weight to 8.0 parts by weight, based on 100 parts by weight of the recycled polyvinyl butyral in the first mixture.

11. The method of claim 1, wherein the free radical initiator is a combination of 2,2'-azobis(2-methylpropionitrile) and dilauroyl peroxide, a combination of 2,2'-azobis(2-methylbutyronitrile) and benzoyl peroxide, or a combination of 2,2'-azobis(2-methylpropionitrile) and benzoyl peroxide.

12. The method of claim 1, wherein the organic peroxide is in an amount from 0.01 parts by weight to 2.5 parts by weight, based on 100 parts by weight of the recycled polyvinyl butyral in the first mixture.

* * * * *